Jan. 28, 1930.  H. R. MASSINGHAM  1,744,779
MATERIAL FEEDING APPARATUS
Filed Oct. 30, 1926   2 Sheets-Sheet 1
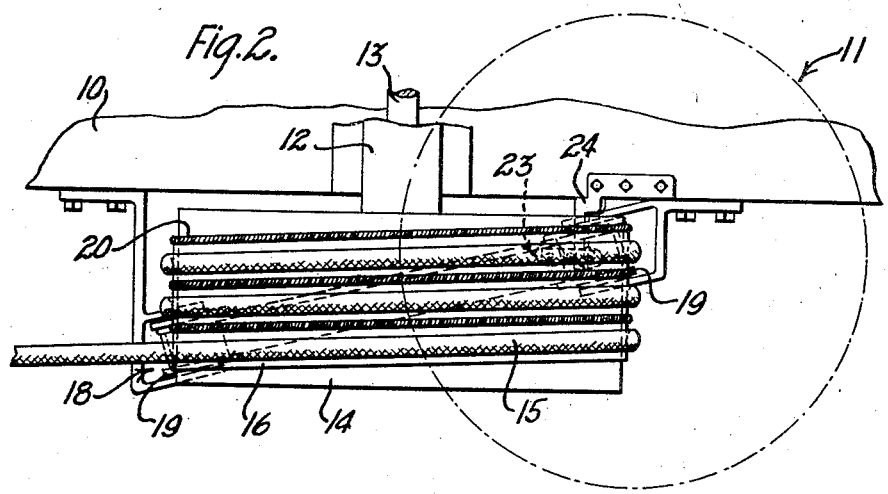
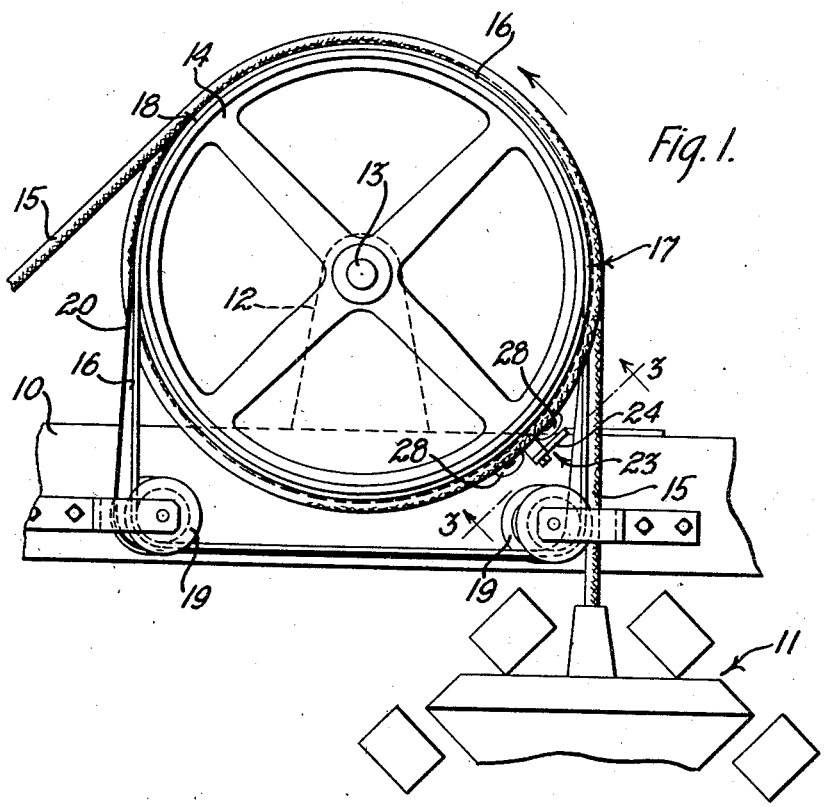
Inventor
Henry R. Massingham
by [signature] Att'y.

Jan. 28, 1930. H. R. MASSINGHAM 1,744,779
MATERIAL FEEDING APPARATUS
Filed Oct. 30, 1926 2 Sheets-Sheet 2

Inventor
Henry R. Massingham
by Hhatterson Att'y.

Patented Jan. 28, 1930

1,744,779

UNITED STATES PATENT OFFICE

HENRY ROGERS MASSINGHAM, OF LA GRANGE, ILLINOIS, ASSIGNOR TO WESTERN ELECTRIC COMPANY, INCORPORATED, OF NEW YORK, N. Y., A CORPORATION OF NEW YORK

MATERIAL-FEEDING APPARATUS

Application filed October 30, 1926. Serial No. 145,354.

This invention relates to material feeding apparatus, and more particularly to such a feeding apparatus which may be used as a pulling element or capstan in the manufacture of strand materials.

The primary object of this invention is the provision of a material feeding apparatus which positively withdraws material from a supply to be delivered to another point and which maintains the material during its movement in predetermined alignment.

In accordance with the general features of this invention as applied to a cylindrical faced capstan operatively associated with a well known form of machine for braiding a textile sheath around telephone cables, there is provided an endless carrier or belt which is spirally wrapped around the periphery of the capstan and driven thereby due to its frictional engagement therewith and which is caused to travel in a circuitous path. The belt, the width of which is greater than the width of the cable, receives the latter from the braiding machine and advances it to its point of take-off through its frictional contact with the belt and maintains the convolutions of the cable separated and in predetermined alignment. An endless steel belt in the form of a spiral spring is interposed between the convolutions of the belt encircling the capstan which serves to prevent wear on the edge of the belt by a booster element provided for causing the lateral displacement of the successive turns of the belt.

Other objects and advantages of this invention will more fully appear from the following detailed description taken in connection with the accompanying drawings, in which Fig. 1 is a side view of a capstan embodying the features of this invention shown in operative association with a usual type of braiding head, the latter being illustrated diagrammatically;

Fig. 2 is a plan view thereof;

Figure 3:
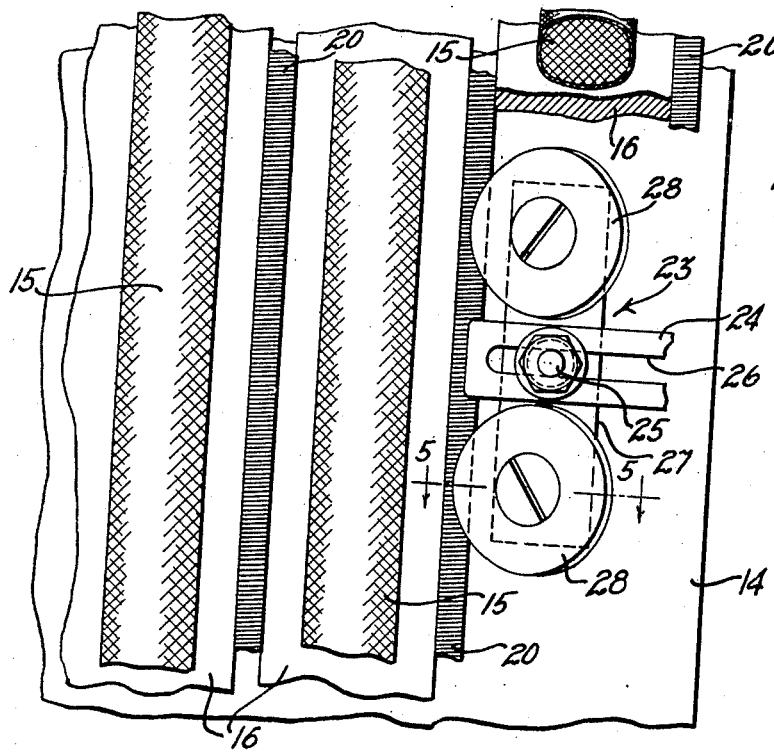
Fig. 3 is a fragmentary enlarged view taken on the line 3—3 of Fig. 1.

Referring now to the drawings wherein like reference numerals designate like parts throughout the several views, and more particularly to Figs. 1 and 2, the numeral 10 indicates a portion of a stationary frame of a braiding machine provided with a braiding head 11 of the usual type, the head being illustrated fragmentarily in diagrammatic form in order to simplify the disclosure since the details thereof are not essential to a full and complete understanding of this invention. Rotatably mounted upon the frame 10 by means of a journal 12 is a shaft 13 which may be driven from a suitable source of power (not shown) in the direction indicated by the arrow (Fig. 1). Secured to the one end of the shaft 13 is a cylindrical faced capstan 14 which serves to draw the member being served, in the present instance a telephone cable 15 of oval cross-section, with a braided sheath by the braiding head 11 and feed it to a power driven take-up apparatus (not shown).

Interposed between the cable 15 and the peripheral face of the capstan 14 is an endless flat belt 16, in the present embodiment constructed of leather, the width of which is greater than the width of the cable for a purpose which will become apparent as this description progresses. The belt 16 is spirally wrapped around the capstan 14, starting from a point 17 directly above the axis of the braiding head 11 as is clearly indicated in Fig. 1, which is the winding-on point or the point at which the sheathed cable 15 leaves the head 11, to approximately the take-off point of the cable, indicated by the numeral 18, at the opposite end of the capstan to the take-on end thereof, or two and one-half turns in contact with the periphery thereof. From this point the belt 16 leaves the periphery of the capstan 14 and passes under and into engagement with pulleys 19 supported by the frame 10 (Fig. 1), which serve to guide the belt back again to the winding-on point hereinbefore described.

Figure 4:
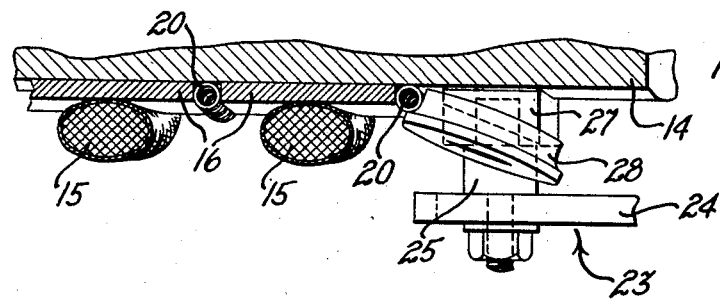
Fig. 4 is an end view thereof.
Figure 5:
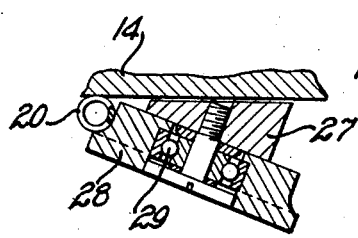
Fig. 5 is an enlarged detail plan section taken on the line 5—5 of Fig. 3.

An endless flexible belt 20, preferably constructed of steel, in the form of a spiral spring travels with the belt 16 around the capstan 14 and the pulleys 19 in engagement with the peripheral face of the capstan and positioned between and engaging the opposite edges of successive turns of the belt (Figs. 3 and 4), which serves to protect the edges of the belt from wear, through friction, from a booster element 23 provided to cause successive turns of the belt to be pushed across the peripheral face of the capstan to the take-off point thereof as the advancing belt engages it. In the present embodiment the booster element 23 comprises an arm 24 fixed to the frame 10 and having adjustably mounted thereon at its free end a shouldered stud 25, a reduced threaded end thereof extending through a slot 26 formed longitudinally in the arm and equipped with a nut whereby the stud may be clamped to the arm upon proper adjustment thereon. Freely pivoted upon the stud 25 is an arm 27 supporting at each end thereof a roller 28, the rollers being journaled upon ball bearings 29 (Fig. 5). The rollers 28 engage the steel belt 20, which travels with the belt 16, at a point approximately where the first turn thereof ends and therefore approximately at the beginning of the second turn. The upper face of the arm 27 as viewed in Fig. 4 which lies adjacent the periphery of the capstan is shaped to substantially fit the curved face thereof and still permit a free movement of the arm upon the stud 25 as it adjusts itself to the angle of the advancing belt 20 through the rollers 28. It will be apparent that the transverse thrust given to successive turns of the leather belt 16 is imparted thereto through contact with the interposed steel belt 20, thereby eliminating substantially all wear on the edges of the belt.

It is believed that the operation of the strand material feeding apparatus embodying the features of this invention will be clearly evident from the foregoing detailed description thereof.

In the particular embodiment of this invention as applied to the drawing of a telephone cable of the hereinbefore described type from a braiding machine and feeding it across the periphery of a cylindrical faced capstan to the take-off point thereof it will be apparent that the successive turns of the cable will be carried around the capstan and across the peripheral face thereof without contact with each other, the capstan or the booster element. Therefore all tendency of the turns of the cable to be jammed against each other which might deform the cable is eliminated. Furthermore, no chafing or abrasion of the cable due to the booster element is possible.

Although this invention has been specifically illustrated and described in connection with a cylindrical faced capstan and an oval type telephone cable, it will be readily understood that it may be adapted equally well to a conical faced capstan and to circular type cables or other forms of strand materials.

What is claimed is:

1. In a strand material feeding apparatus, a rotating drum member, and means driven thereby disposed longitudinally of and in engagement with the strand material to advance it along the longitudinal axis thereof and traveling in the same path as the material being conveyed for progressively moving the material parallel to the axis of the drum member.

2. In a material feeding apparatus, a rotatable member, and means movable therewith and helically engaging the circumference thereof to receive a turn of material thereon for moving the material laterally across the face of the member during a rotation thereof.

3. In a strand material feeding apparatus, a rotatable member, and means frictionally driven thereby and helically engaging the periphery thereof to receive a turn of strand material thereon for moving the strand material across the periphery of the member during a rotation thereof.

4. In a strand material feeding apparatus, a rotatable member, and means movable therewith and wrapped circumferentially a plurality of turns therearound to receive a plurality of turns of strand material thereon for moving the strand material across the periphery of the member during a rotation thereof.

5. In a strand material feeding apparatus, a rotatable member, and an endless flexible means frictionally driven thereby and helically engaging the periphery thereof to receive a turn of strand material thereon for moving the strand material across the periphery of the member during a rotation thereof.

6. In a strand material feeding apparatus, a rotatable member, and a single endless member driven by the rotation thereof to receive a turn of strand material thereon, the member receiving a rotary and transverse movement therefrom to provide a simultaneous longitudinal and transverse movement of the strand material.

7. In a strand material feeding apparatus, a rotatable member, means surrounding the member and movable therewith to receive a turn of strand material longitudinally of the strand, and an element operatively associated with the means for causing the latter to move with the turn of and in a path parallel with the axis of strand material thereon across the periphery of the member as it moves therewith.

8. In a strand material feeding apparatus, a rotatable member, an endless flat belt movable therewith to receive a turn of strand material longitudinally thereon, an element operatively associated with the belt for causing the latter to move with the turn of strand material thereon across the periphery of the member as it moves therewith, and an endless means traveling with the belt and positioned intermediate the stationary element and the belt.

9. In a strand material feeding apparatus, a rotatable member, means movable therewith and wrapped a plurality of turns therearound to receive a plurality of turns of strand material thereon, and a pivoted member having a stationary point of support carrying a plurality of rollers for engaging the means at a point approximately at the beginning of the second turn thereof around the member for causing successive turns of the means to move with the turns of strand material thereon across the periphery of the member as it moves therewith.

10. In a strand material feeding apparatus, a rotatable member, an endless flexible means driven therewith and engaging the periphery thereof for a plurality of turns to receive a plurality of turns of strand material thereon for moving the strand material across the periphery of the member during a rotation thereof, and means for guiding the means upon completion of a movement thereof across the periphery of the member back to its starting point.

11. In a strand material feeding apparatus, a rotatable cylindrical member, an endless flexible means wrapped spirally therearound and frictionally engaging the periphery thereof for a plurality of turns to receive a plurality of turns of strand material thereon for moving the strand material across the periphery of the member during a rotation thereof, and a plurality of rollers for guiding the means upon completion of a movement thereof across the periphery of the member back to its starting point.

In witness whereof, I hereunto subscribe my name this 23rd day of October, A. D. 1926.

HENRY ROGERS MASSINGHAM.